US011351469B2

(12) United States Patent
Watson et al.

(10) Patent No.: US 11,351,469 B2
(45) Date of Patent: Jun. 7, 2022

(54) METHOD FOR CREATING A MINI-GAME

(71) Applicant: Sony Interactive Entertainment Inc., Tokyo (JP)

(72) Inventors: Brian Michael Christopher Watson, San Francisco, CA (US); Victor Octav Suba Miura, Foster City, CA (US); Jacob P. Stine, La Honda, CA (US); Nicholas J. Cardell, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 9 days.

(21) Appl. No.: 16/736,800

(22) Filed: Jan. 7, 2020

(65) Prior Publication Data
US 2020/0139256 A1    May 7, 2020

Related U.S. Application Data

(60) Continuation of application No. 15/650,755, filed on Jul. 14, 2017, now Pat. No. 10,525,359, which is a division of application No. 13/631,740, filed on Sep. 28, 2012, now Pat. No. 9,707,476.

(51) Int. Cl.
*A63F 13/88* (2014.01)
*A63F 13/60* (2014.01)
*A63F 13/70* (2014.01)
*A63F 13/69* (2014.01)

(52) U.S. Cl.
CPC .............. *A63F 13/88* (2014.09); *A63F 13/60* (2014.09); *A63F 13/70* (2014.09); *A63F 13/69* (2014.09); *A63F 2300/6009* (2013.01); *A63F 2300/6036* (2013.01)

(58) Field of Classification Search
None
See application file for complete search history.

(56) References Cited

U.S. PATENT DOCUMENTS

| 2006/0080702 A1* | 4/2006 | Diez ..................... A63F 13/335 725/30 |
| 2007/0060342 A1* | 3/2007 | Sakaguchi ............ A63F 13/218 463/31 |
| 2012/0052957 A1* | 3/2012 | Yokoyama .............. A63F 13/35 463/42 |

OTHER PUBLICATIONS

Crazyreyn, GameFaqs, "Super Mario 64 DS—Guide and Walkthrough", https://gamefaqs.gamespot.com/ds/920758-super-mario-64-ds/faqs/43950, Aug. 12, 2006 (Year: 2006).*

* cited by examiner

*Primary Examiner* — Damon J Pierce
(74) *Attorney, Agent, or Firm* — Penilla IP, APC

(57) ABSTRACT

A starting location for the mini-game is chosen in the legacy game state. A snapshot is generated of that location. Once the snapshot is taken, trigger events are identified. Triggers corresponding to the trigger events are identified. A mini-game script is generated using the snapshot and triggers. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

8 Claims, 6 Drawing Sheets

METHOD FOR CREATING A MINI-GAME

CLAIM OF PRIORITY

This application is a Continuation of U.S. application Ser. No. 15/650,755, filed on Jul. 14, 2017, (U.S. Pat. No. 10,525,359, issued on Jan. 7, 2020), and entitled "METHOD FOR CREATING A MINI-GAME", which is a divisional of U.S. application Ser. No. 13/631,740, filed on Sep. 28, 2012, (U.S. Pat. No. 9,707,476, issued on Jul. 18, 2017), entitled "METHOD FOR CREATING A MINI-GAME" the entire contents of which are herein incorporated by reference.

CROSS-REFERENCE TO RELATED APPLICATION

This application is related to commonly-assigned, provisional application entitled "DETERMINING TRIGGERS FOR CLOUD-BASED EMULATED GAMES" to Brian Michael Christopher Watson, Victor Octav Suba Miura, Jacob P. Stine and Nicholas J. Cardell, U.S. Application No. 61/666,628, filed Jun. 29, 2012, the entire disclosures of which are incorporated herein by reference.

This application is related to commonly-assigned, provisional application entitled "HAPTIC ENHANCEMENTS FOR EMULATED VIDEO GAME NOT ORIGINALLY DESIGNED WITH HAPTIC CAPABILITIES" to Victor Octav Suba Miura and Brian Michael Christopher Watson, U.S. Application No. 61/666,645, filed Jun. 29, 2012, the entire disclosures of which are incorporated herein by reference.

This application is related to commonly-assigned, provisional application entitled "CONVERSION OF HAPTIC EVENTS INTO SCREEN EVENTS" to Brian Michael Christopher Watson and Victor Octav Suba Miura, U.S. Application No. 61/666,665 filed Jun. 29, 2012, the entire disclosures of which are incorporated herein by reference.

This application is related to commonly-assigned, provisional application entitled "SUSPENDING STATE OF CLOUD-BASED LEGACY APPLICATION" to Jacob P. Stine, Brian Michael Christopher Watson, Victor Octav Suba Miura and Nicholas J. Cardell, U.S. Application No. 61/666,679, filed Jun. 29, 2012, the entire disclosures of which are incorporated herein by reference.

This application is related to commonly-assigned, co-pending application Ser. No. 13/631,725, filed Sep. 28, 2012, and entitled "REPLAY AND RESUMPTION OF SUSPENDED GAME" to Brian Michael Christopher Watson, Victor Octav Suba Miura, Jacob P. Stine and Nicholas J. Cardell, filed the same day as the present application, the entire disclosures of which are incorporated herein by reference.

This application is related to commonly-assigned, co-pending application Ser. No. 13/631,785, filed Sep. 28, 2012, and entitled "PRE-LOADING TRANSLATED CODE IN CLOUD BASED EMULATED APPLICATIONS", to Jacob P. Stine, Victor Octav Suba Miura, Brian Michael Christopher Watson, and Nicholas J. Cardell the entire disclosures of which are incorporated herein by reference.

This application is related to commonly-assigned, co-pending application Ser. No. 13/631,803, filed Sep. 28, 2012, and entitled "ADAPTIVE LOAD BALANCING IN SOFTWARE EMULATION OF GPU HARDWARE", to Takayuki Kazama and Victor Octav Suba Miura, the entire disclosures of which are incorporated herein by reference.

This application is related to commonly-assigned, co-pending application Ser. No. 13/631,812, filed Sep. 28, 2012, entitled "METHOD AND APPARATUS FOR IMPROVING EFFICIENCY WITHOUT INCREASING LATENCY IN EMULATION OF A LEGACY APPLICATION TITLE", to Jacob P. Stine and Victor Octav Suba Miura, the entire disclosures of which are incorporated herein by reference.

FIELD OF THE DISCLOSURE

The present disclosure is related to a method for creating a video mini-game based on a legacy game title using a snapshot technique. Among other things, this application describes a method for creating a video mini-game from a legacy game by identifying an interesting location in the game where the mini-game can begin. This location is called a snapshot. This method creates a new game based on a snapshot of a legacy game, and provides small cuts of entertainment for players who do not want to play the whole legacy game.

BACKGROUND OF THE INVENTION

Finding new ways to play legacy video games can increase the longevity of older games. Instead of playing the whole game, which can span many hours, gamers desire an opportunity to play a game with a shorter time frame. Gamers also appreciate being able to play a game with which they are familiar. It is within this context that aspects of the present disclosure arise.

INTRODUCTION

Figure 1:
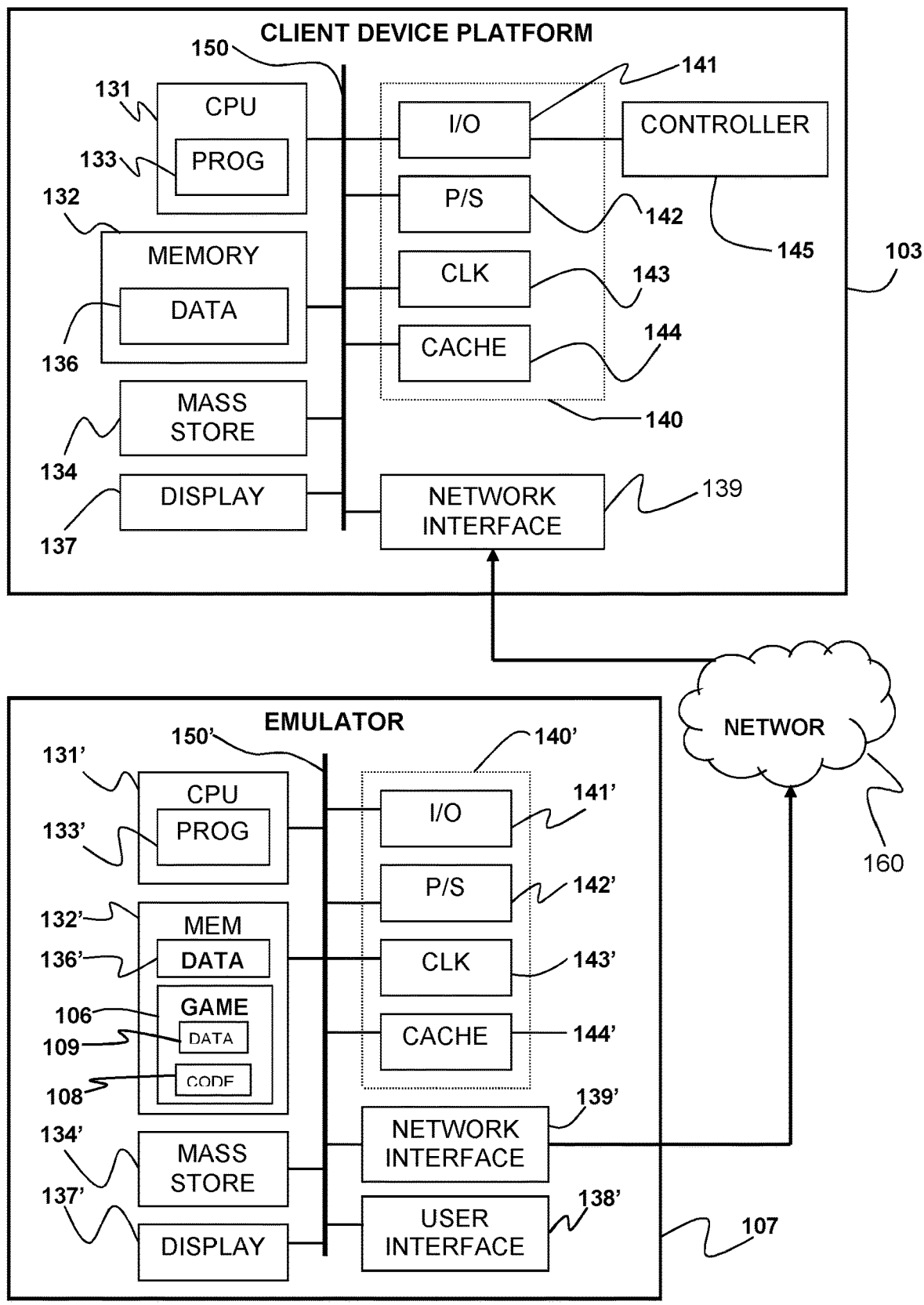
FIG. 1 is a schematic diagram of a client device platform and an emulator communicating over a network according to an aspect of the present disclosure.

In response to the need for increasing the longevity of legacy games and to play a game with a shorter time frame in which the gamer is familiar, a method to create mini-games has been devised. The method is based on creating a mini-game from a legacy game title using a snapshot technique. The method involves a mini-game generator generating a snapshot of an interesting starting location within the legacy game. There is some defined event that when achieved will cause the mini-game to reach an endpoint or a non-endpoint. These events can include, without limitation, the mini-game timing out, a certain score being achieved, the lead character being neutralized, the adversary being neutralized, or some other objective being reached. One or more triggers that correspond to the events are identified from the legacy game. The triggers are used to define the endpoint of the mini-game. The triggers can also be used to define other corresponding events that occur during mini-game play. The mini-game generator records the snapshot and triggers data. A developer can create a script from the captured data (snapshot and triggers) and bundle the script with the captured data. Within a mini-game, the gamer can be instructed to complete new objectives or challenge their friends for high scores in a format that was not originally designed into the legacy game. Further, since the mini-game is derived from a legacy game, the gamer already knows the characters and basic components of the game, and is therefore more likely to play the mini-game.

DETAILED DESCRIPTION OF THE DRAWINGS

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

In order to create mini-games without reverse engineering and recoding a legacy game, a game designer may rely on the use of triggers and snapshots to provide information needed for the mini-games without having to dig into the code of the legacy game. The mini-games may be created by providing an emulator with game inputs that bring the emulated game to a certain point where the mini-game will begin. A snapshot may be generated at that point in order to be used as the starting point in the future mini-game. A snapshot can be generated at any location in a legacy game. As used herein, a snapshot may be a recorded description of the state of every device being emulated at a designated time during the emulation according to an aspect of the present disclosure.

A snapshot may be generated by a snapshot generator as follows. First the snapshot generator delivers game inputs to an emulator. The emulator receives the game inputs and proceeds to emulate the game according to the game inputs. At some point during the emulation, the snapshot generator delivers a suspension request to the emulator. Once the suspension request is received, the emulator will suspend the emulated title at the next point in time at which all devices being emulated are in a steady state. Steady state means there are no asynchronous activities occurring in the emulator. At this steady state, the snapshot generator generates a snapshot of the emulated game by recording the current state of all devices being emulated. Snapshots are further described in commonly assigned application Ser. No. 61/666,679 filed on Jun. 29, 2012, and entitled "SUSPENDING STATE OF CLOUD-BASED LEGACY APPLICATIONS", which has been incorporated herein by reference.

Once the snapshot is taken to identify the starting point in the mini-game, triggers may be generated according to aspects of the present disclosure in order to provide new experiences for the game. According to an aspect of the present disclosure, a trigger event that requires an emulator to produce a desired output is identified. A trigger that is associated with the trigger event is then identified and stored in a memory of the emulator. Thereafter, when the emulator runs an emulation routine, it will compare the emulated game data to the trigger stored in its memory, and will therefore know to produce the desired output when the emulated game data matches the trigger. Game designers may then develop a script by using the snapshot and triggers to produce the mini-game. Triggers are further described in commonly assigned application Ser. No. 61/666,628 filed on Jun. 29, 2012, and entitled "DETERMINING TRIGGERS FOR CLOUD-BASED EMULATED GAMES", which has been incorporated herein by reference.

FIG. 1 is a schematic diagram illustrating interaction between client device platform 103 and an emulator 107 according to aspects of the present disclosure. The emulator 107 may be accessed by a client device platform 103 over a network 160. Although only a single emulator is shown in FIG. 1, aspects of the present disclosure are not limited to such implementations. The client device platform 103 may access a plurality of alternative emulators 107 over the network 160. The emulators 107 may be identical to each other, or they may each be programmed to emulate unique legacy game titles 106 or unique sets of legacy game titles 106.

The client device platform 103 may include a central processor unit (CPU) 131. By way of example, a CPU 131 may include one or more processors, which may be configured according to, e.g., dual-core, quad-core, multi-core, or Cell processor architecture. The client device platform 103 may also include a memory 132 (e.g., RAM, DRAM, ROM, and the like). The CPU 131 may execute a process-control program 133, portions of which may be stored in the memory 132. The client device platform 103 may also include well-known support circuits 140, such as input/output (I/O) circuits 141, power supplies (P/S) 142, a clock (CLK) 143 and cache 144. The client device platform 103 may optionally include a mass storage device 134 such as a disk drive, CD-ROM drive, tape drive, or the like to store programs and/or data. The client device platform 103 may also optionally include a display unit 137. The display unit 137 may be in the form of a cathode ray tube (CRT) or flat panel screen that displays text, numerals, or graphical symbols. A controller 145 may be connected to the client device platform 103 through the I/O circuit 141 or it may be directly integrated into the client device platform 103. The controller 145 may facilitate interaction between the client device platform 103 and a user. The controller 145 may include a keyboard, mouse, joystick, light pen, hand-held controls or other device. The client device platform 103 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The client device platform 103 may send and receive data and/or requests for files via one or more data packets over the network 160.

The preceding components may exchange signals with each other via an internal system bus 150. The client device platform 103 may be a general purpose computer that becomes a special purpose computer when running code that implements embodiments of the present invention as described herein.

The emulator 107 may include a central processor unit (CPU) 131'. By way of example, a CPU 131' may include one or more processors, which may be configured according to, e.g., a dual-core, quad-core, multi-core, or Cell processor architecture. The emulator 107 may also include a memory 132' (e.g., RAM, DRAM, ROM, and the like). The CPU 131' may execute a process-control program 133', portions of which may be stored in the memory 132'. The emulator 107 may also include well-known support circuits 140', such as input/output (I/O) circuits 141', power supplies (P/S) 142', a clock (CLK) 143' and cache 144'. The emulator 107 may optionally include a mass storage device 134' such as a disk drive, CD-ROM drive, tape drive, or the like to store programs and/or data. The emulator 107 may also optionally include a display unit 137' and user interface unit 138' to facilitate interaction between the emulator 107 and a user who requires direct access to the emulator 107. By way of example and not by way of limitation a client device platform 103 or engineer may need direct access to the emulator 107 in order to program the emulator 107 to properly emulate a desired legacy game 106 or to add additional mini-game capabilities to a legacy game 106. The display unit 137' may be in the form of a cathode ray tube (CRT) or flat panel screen that displays text, numerals, or graphical symbols. The user interface unit 138' may include a keyboard, mouse, joystick, light pen, or other device. The emulator 107 may include a network interface 139', configured to enable the use of Wi-Fi, an Ethernet port, or other communication methods.

The network interface 139' may incorporate suitable hardware, software, firmware or some combination of two or more of these to facilitate communication via the electronic communications network 160. The network interface 139' may be configured to implement wired or wireless communication over local area networks and wide area networks such as the Internet. The emulator 107 may send and receive data and/or requests for files via one or more data packets over the network 160.

The preceding components may exchange signals with each other via an internal system bus 150'. The emulator 107 may be a general purpose computer that becomes a special purpose computer when running code that implements embodiments of the present invention as described herein.

Emulator 107 may access a legacy game 106 that has been selected by the client device platform 103 for emulation through the internal system bus 150'. There may be more than one legacy game 106 stored in the emulator 107, e.g., in the memory 132' or in the mass storage device 134'. Additionally, one or more legacy games 106 may be stored at a remote location accessible to the emulator 107 over the network 160. Each legacy game 106 contains game code 108. When the legacy game 106 is emulated, the game code 108 produces legacy game data 109.

By way of example, a legacy game 106 may be any game that is not compatible with a target platform. By way of example and not by way of limitation, the legacy game 106 may have been designed to be played on Sony Computer Entertainment's PlayStation console, but the target platform is a home computer. By way of example, the legacy game 106 may have been designed to be played on a PlayStation 2 console, but the target platform is a PlayStation 3 console. Further, by way of example and not by way of limitation, a legacy game 106 may have been designed to be played on a PlayStation console, but the target platform is a hand held console such as the PlayStation Vita from Sony Computer Entertainment.

Figure 2:
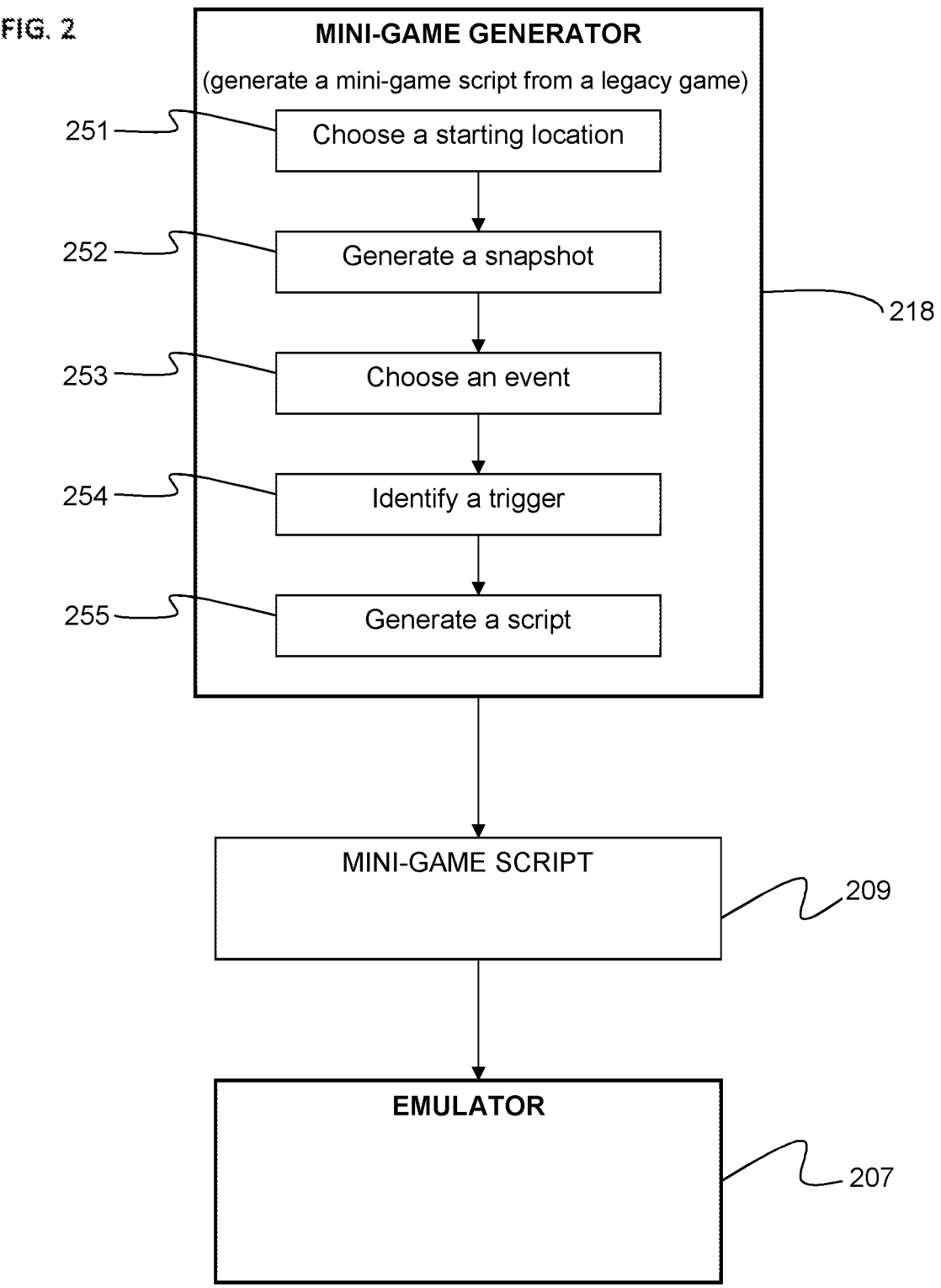
FIG. 2 is a block diagram illustrating a method of generating a mini-game script from a pre-existing game and delivering the script to the emulator.

As shown in FIG. 2, the mini-game is generated from a legacy game. By way of example, and not by way of limitation, the mini-game generator 218 chooses a mini-game starting location in the legacy game, as indicated at 251. The starting location may be any location within the legacy game. After a starting location is chosen, the mini-game generator generates a snapshot of that point in the legacy game, as indicated at 252. The next step is to choose one or more events from the legacy game execution state, as indicated at 253. In some implementations, the executions state may be modified slightly after it has been loaded. By way of example, and not by way of limitation, the execution state maybe modified by setting the current score, number of lives remaining, or remaining time in the game.

The mini-game generator identifies one or more triggers that correspond to the events, as indicated at 254. The events may include, by way of example and without limitation, mini-game-ending triggers such as the mini-game timing out, an adversary being neutralized, a protagonist being neutralized or a certain score being achieved. The events may also include, by way of example and without limitation, non-mini-game-ending triggers such as a certain score being achieved or a game character reaching a certain level within the game. The identified triggers may include changes in the game state or game data that correspond to the events. For example, if the event is a certain score being achieved, the corresponding trigger would occur when the game data indicates that the certain score has been achieved. The mini-game generator combines the snapshot and triggers to generate a script 209 for a particular mini-game, as indicated at 255. The mini-game script 209 selection may then be loaded on an emulator 207. The mini-game script 209, a snapshot of the starting location and trigger data may all be stored in a non-transitory computer-readable medium.

In some implementations, game state information may be harvested and utilized within a controlling script to determine subsequent events within the mini-game. By way of example, and not by way of limitation, information regarding virtual items obtained by a player during one the mini-game may be carried over to a subsequent part. Alternatively, the score may determine whether a player advances to another level or determines the level to which the player advances after a section the mini-game has been completed.

Figure 3:
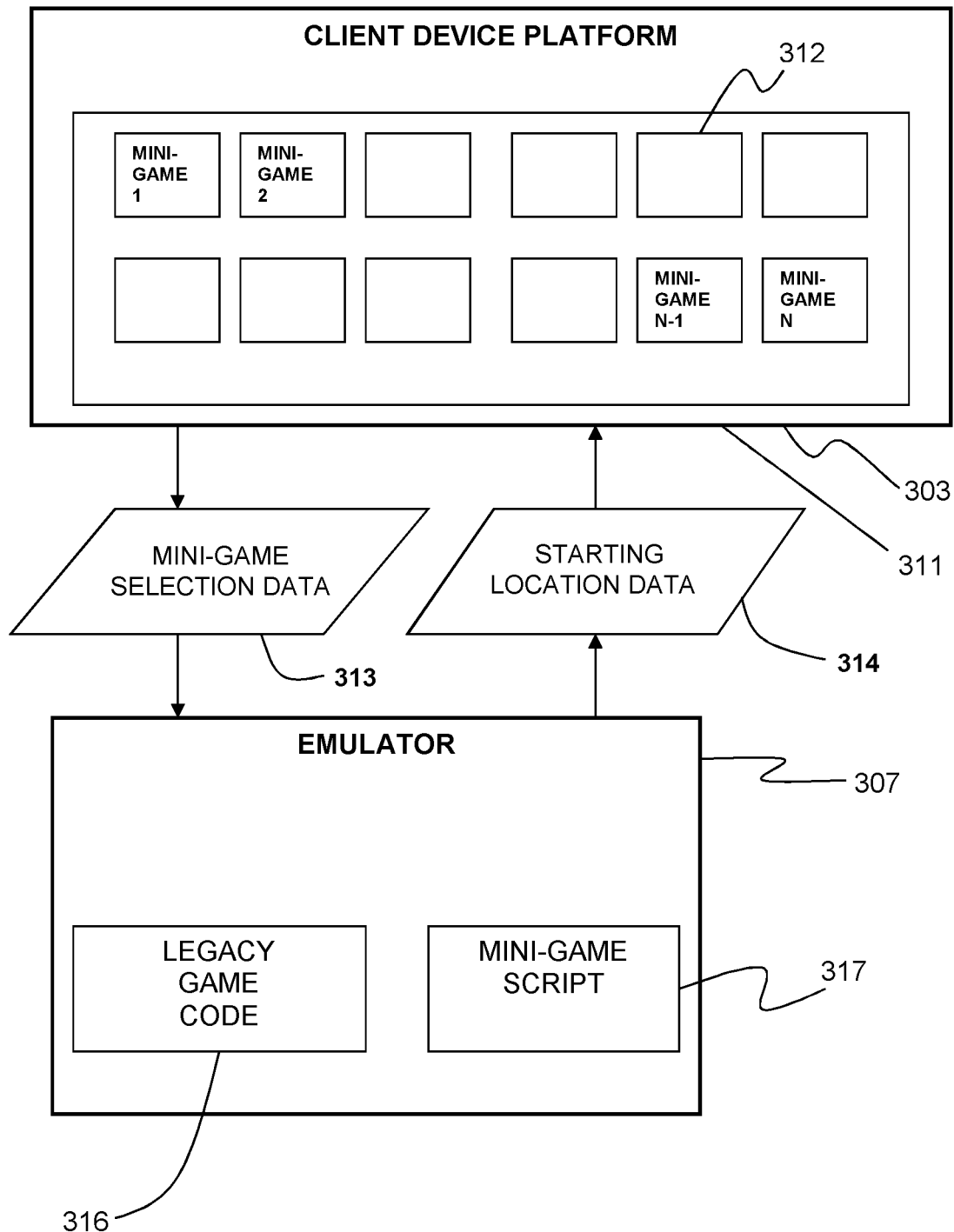
FIG. 3 is a block diagram illustrating a method of selecting a mini-game at the client device platform and sending the mini-game selection input to the emulator.

FIG. 3 schematically illustrates an example of implementing a mini-game. A client device platform 303 instructs an emulator 307 to send emulated game data of a legacy game by selecting a mini-game option from a plurality of mini-game choices 312 as they may appear on the client device platform display 311. Based on the mini-game 312 selected, the mini-game script 317 provides the emulator 307 with game inputs that bring the emulated game to the starting location of the mini-game within the legacy game execution state 316. The starting location data 314 of the emulated game are then sent to the client device platform 303 and are shown on the client device platform display 311.

Figure 4:
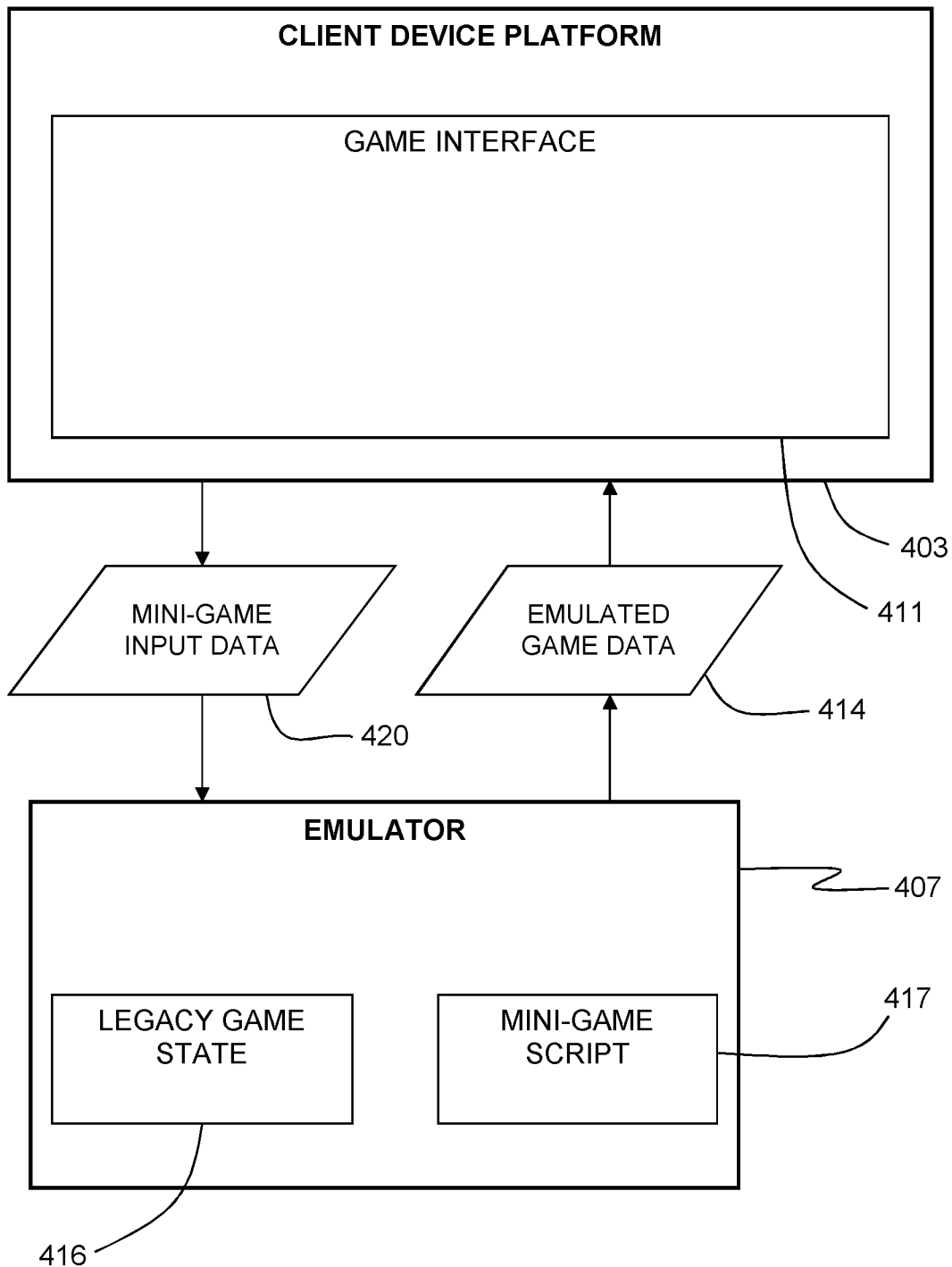
FIG. 4 is a block diagram illustrating how the instructions for the mini-game snapshot and emulated game data are sent to the client device platform, mini-game input data is sent back to the emulator.

FIG. 4 schematically illustrates another example of implementing a mini-game. In this example, as game play begins, a client device platform 403 receives emulated game data 414 of a legacy game from an emulator 407. As the game is played on the client device (e.g., using a game interface 411, which may be implemented in hardware or software or some combination thereof), emulated game data 414 is continually sent to the client device platform 403 from the emulator 407. Simultaneously, mini-game input data 420 is sent from the client device platform 403 to the emulator 407. The mini-game script 417 monitors game play that results from the emulated game data 414 and input data 420 to determine if any triggers occur. The mini-game script 417 provides the emulator 407 with game inputs that bring the emulated game to an end when a game-ending trigger occurs. The mini-game script 417 may also provide the emulator 407 with non-game-ending inputs when a non-game-ending trigger occurs.

Figure 5:
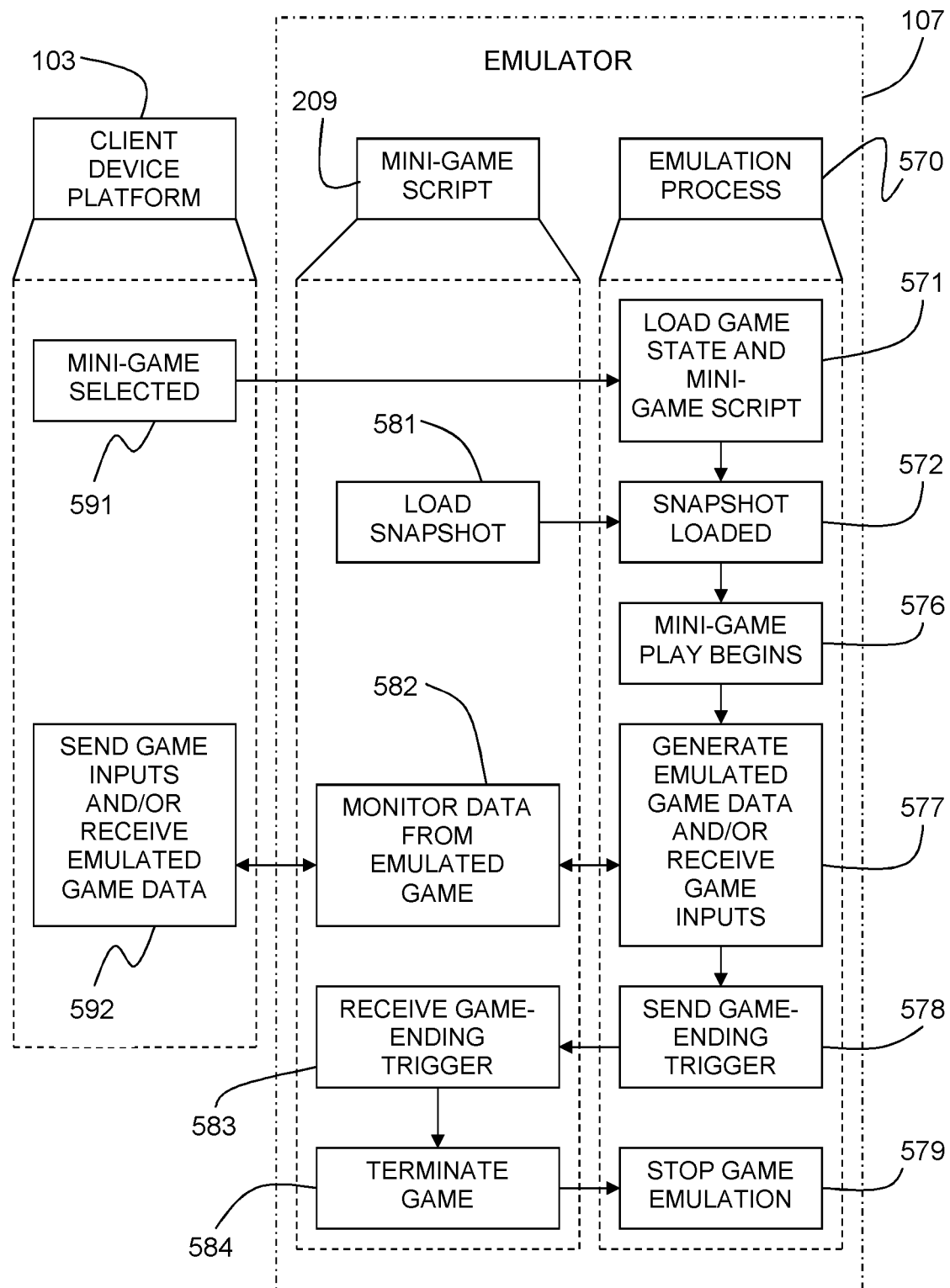
FIG. 5 is a block diagram illustrating the emulation process and the interaction between the emulator, mini-game script and client device platform.

FIG. 5 is a flow diagram illustrating the interaction between the client device platform 103 the mini-game script 109 and the emulation process 570. In one embodiment, the mini-game is selected from the client device platform 103, as indicated at 591. The mini-game selection data is sent to the emulator 107 which loads the game instructions and the mini-game script 109, as indicated at 571. The mini-game script 109 loads the snapshot 581 onto the emulator 107 and mini-game play begins, as indicated at 576. The emulator 107 generates emulated game data as indicated at 577. The emulated game data is sent to the client device platform 103. The client device platform 103 receives emulated game data from the emulator 107, as indicated at 592. The client device platform 103 sends game inputs as also indicated at 592 which are received by the emulator 107, as also indicated at 577. The mini-game script 109 monitors data from the emulated game identifying triggers that correspond to events within the game, as indicated at 582.

Figure 6:
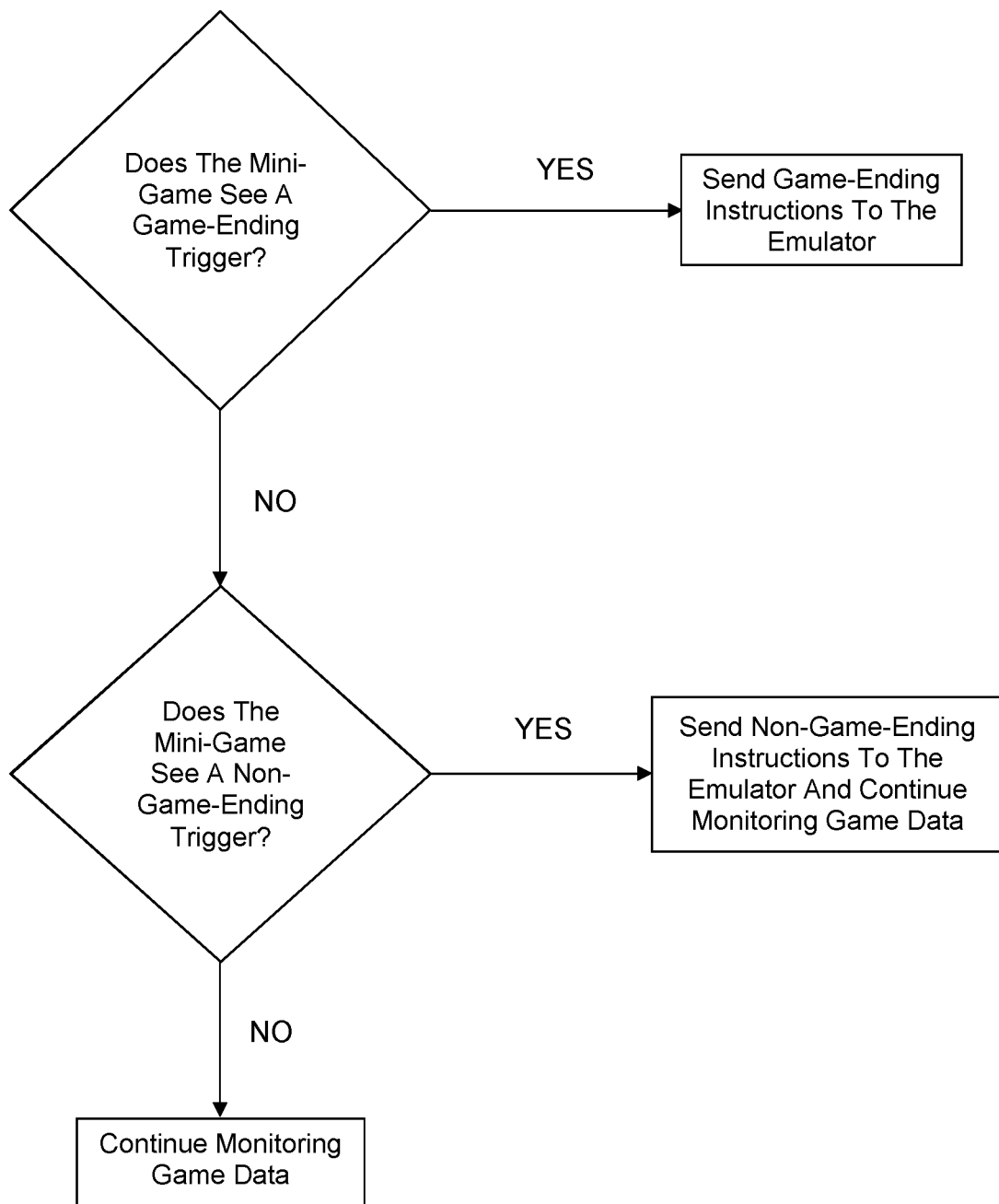
FIG. 6 is a decision tree illustrating how the mini-game script responds to triggers.

FIG. 6 is a decision tree illustrating how the mini-game script 209 monitors data from the emulated game at 582. If the mini-game script detects a mini-game-ending trigger, e.g., by comparing the emulated game data to the trigger data, the script sends mini-game-ending instructions to the emulator. If the mini-game script does not detect a mini-game-ending trigger it continues monitoring the game data. If the mini-game script detects a non-mini-game-ending trigger, the script sends non-game-ending instructions to the emulator and continues monitoring the game data.

As may be seen from the foregoing, embodiments of the present invention allow for the increased utility of legacy games through the use of snapshots and triggers without having to expend the resources required for creating an entirely new game. This provides game players with the benefit of shorter gaming experiences for games in which they are already familiar.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for implementing a mini-game, comprising:
receiving one or more load instructions from a client device at a remote computer for executing an emulator to load a snapshot from a game, the snapshot being associated with an execution state, and the snapshot is associated with data representing a starting location of the mini-game, and the snapshot is further associated with saved data to enable the execution state to render interactive content from said starting location, the save data of the snapshot includes game inputs received from the client device to advance the game to the starting location of the mini-game, including one or more intermediate states recorded to the snapshot to advance the game to said starting location;
monitoring emulated data produced by the emulator during execution of the mini-game for one or more pre-determined events with the client device;
detecting a pre-determined event in the emulated data; and
providing one or more instructions to the emulator when the pre-determined event is detected to cause a change in the execution state of the mini-game as viewed from the client device.

2. The method of claim 1, wherein the starting location of the snapshot is associated to any location in the game after a beginning of the game.

3. The method of claim 1, wherein the pre-determined event corresponds to a mini-game end.

4. The method of claim 3, wherein the mini-game-end occurs after one of the game timing out, or an adversary being neutralized, or a protagonist being neutralized, or a certain score being achieved, or termination of an action sequence.

5. A method for implementing a mini-game from a remote computer that is part of a cloud gaming system, comprising:
receiving one or more load instructions from a client device at the remote computer for executing an emulator to load a snapshot of a game, the snapshot representing the mini-game, and the mini-game is associated with an execution state of the game that occurs after gameplay of the game has occurred, the mini-game having a starting location and the snapshot is associated with saved data to enable the execution state to render interactive content for said mini-game beginning from said starting location, the save data of the snapshot includes game inputs received from the client device to advance the game to the starting location of the mini-game, including one or more intermediate states recorded to the snapshot to advance the game to said starting location;
monitoring emulated data produced by the emulator during execution of the mini-game for one or more events caused from input received from the client device;
providing one or more instructions to the emulator when one of said events is detected to cause a change in the execution state of the mini-game as directed from said input received from the client device.

6. The method of claim 5, wherein the starting location of the snapshot is associated to any location in the game.

7. The method of claim 5, wherein one of the events corresponds to a mini-game end.

8. The method of claim 7, wherein the mini-game-end occurs after one of the game timing out, or an adversary being neutralized, or a protagonist being neutralized, or a certain score being achieved, or termination of an action sequence.

* * * * *